June 15, 1926.
S. E. LIEDABRAND
1,589,016
DRAFT MECHANISM FOR TRAILERS
Filed May 15, 1924   3 Sheets-Sheet 1
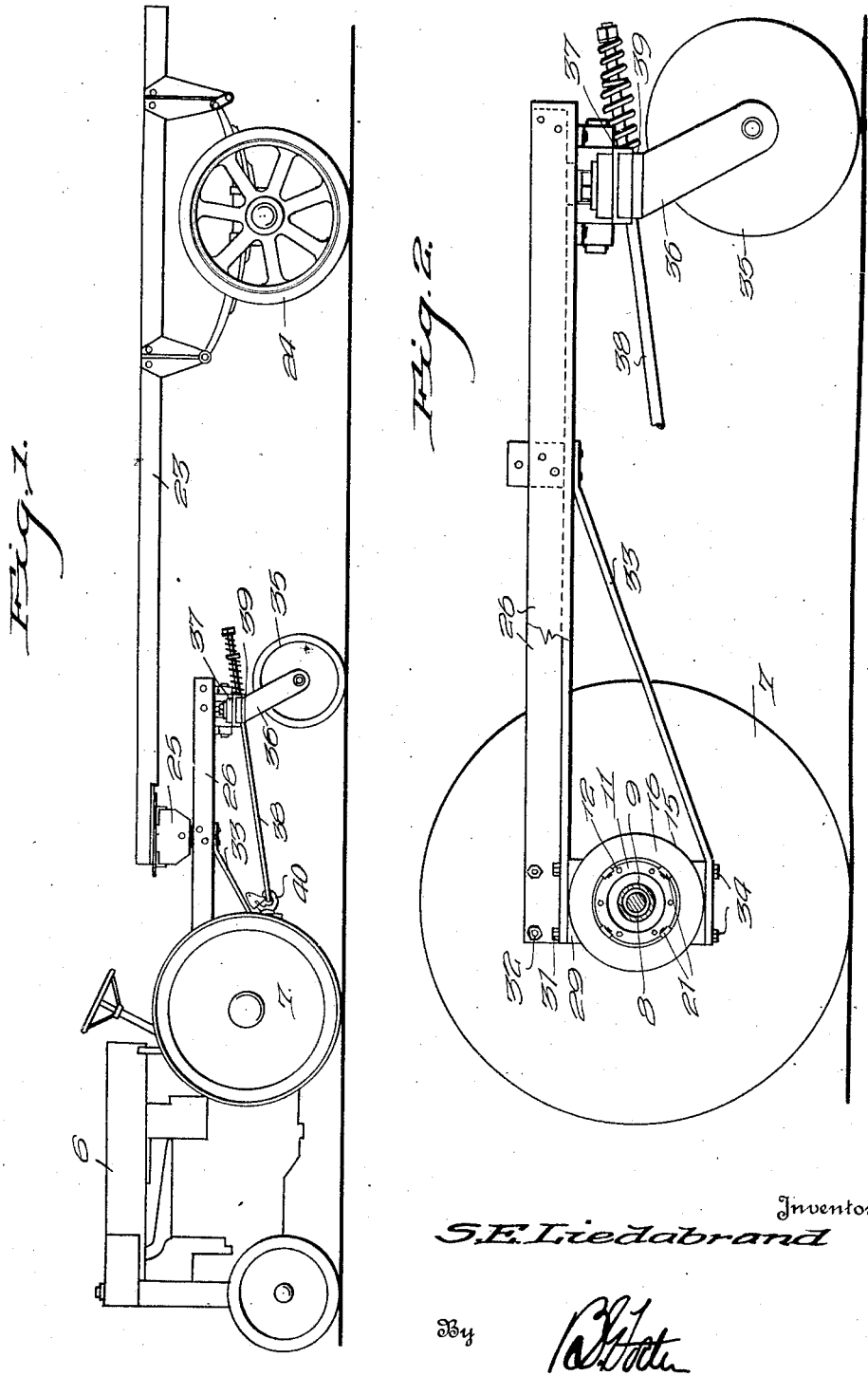
Inventor
S. E. Liedabrand
By [signature]
Attorney June 15, 1926.
S. E. LIEDABRAND
1,589,016
DRAFT MECHANISM FOR TRAILERS
Filed May 15, 1924  3 Sheets-Sheet 2
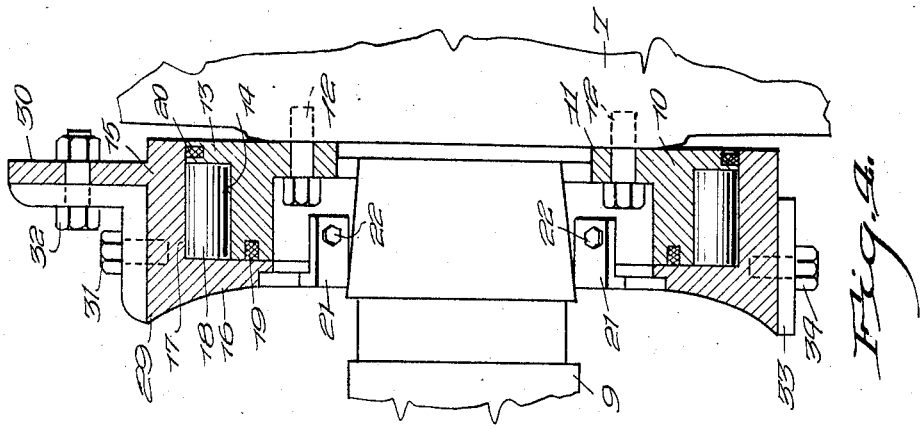
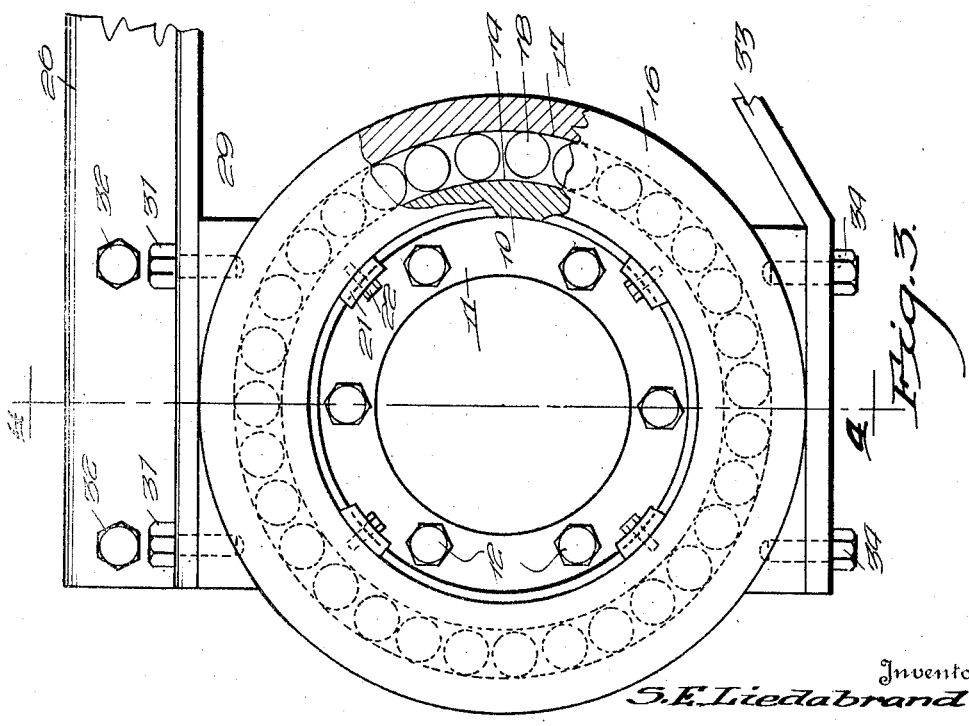

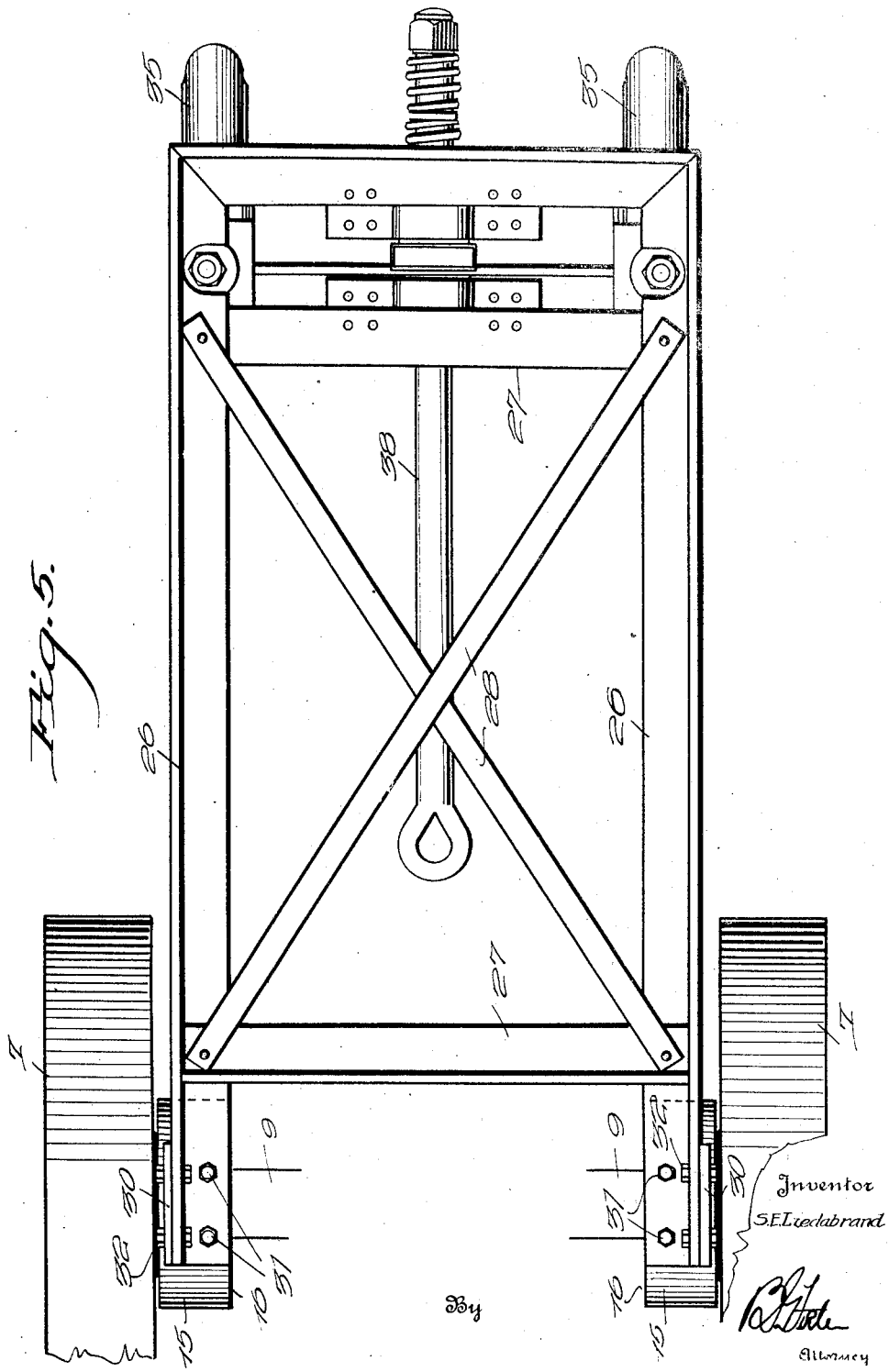

Patented June 15, 1926.

1,589,016

UNITED STATES PATENT OFFICE.

SAMUEL E. LIEDABRAND, OF SPRINGFIELD, ILLINOIS.

DRAFT MECHANISM FOR TRAILERS.

Application filed May 15, 1924. Serial No. 713,571.

The present invention relates to draft means for trailers, and more particularly to the means for connecting a trailer or like member to the draft vehicle, such as a tractor. The object is to provide means of this character that will place the strain on the wheels directly instead of on the tractor housings. Experience has shown that this eliminates the liability of breaking the housing or the rear axle or crushing the bearings for the drive shaft, thereby eliminating the serious difficulty in connection with structures of this kind.

In the accompanying drawings:—
Figure 1 is a side elevation of a tractor and trailer connected thereto, Figure 2 is a sectional view through the rear section of the tractor and showing one of the mountings in elevation, Figure 3 is a view on an enlarged scale of the mounting, Figure 4 is a sectional view on the line 4—4 of Figure 3, Figure 5 is a plan view of the preferred structure of the dolly frame, forming a part of the trailer.

In the embodiment disclosed a tractor is shown in outline at 6, and includes rear driving wheels 7 mounted on a suitable driving axle, shown at 8 in Figure 2, said axle being located in the usual housing 9.

Secured to the inner side of the hub of each of the rear driving wheels 7 is a spindle element in the form of a ring 10, said ring having an inwardly extending annular flange 11, through which are passed fastening bolts 12 engaged with the wheel 7 and securing the ring in place concentrically to the axis of rotation of the wheel, so that said spindle element will rotate with the wheel. The ring 10 furthermore has an outstanding annular flange 13 at its inner end, thereby forming a roller race 14. The spindle ring 10 is rotatably mounted in a journal box 15 having an inwardly extending flange 16, forming a roller race 17. In the races 14 and 17 are located suitable antifriction rollers 18. Preferably the spindle 10 and its flange 13 are provided with packing gaskets 19 and 20. The journal box 15 is held in place by angle brackets 21 that overlap the inner portion of the flange 16, and are secured to the spindle ring 10 by suitable bolts 22.
While any suitable form of trailer may be employed, that shown includes a platform 23 supported on rear wheels 24 and having a bolster 25 at its front end resting on a dolly frame. This dolly frame preferably consists of side draft bars 26 connected by cross bars 27 and diagonal crossed braces 28. The front ends of the draft bars 26 rest upon flat seats 29 formed on the upper sides of the journal boxes 15, and said journal boxes also have upstanding flanges 30, against which the vertical flanges of the angle bars bear. Bolts 31 and 32 serve to secure the front ends of the draft bars 26 to the said journal boxes 15. Braces 33, secured to the undersides of the draft bars 26, are also bolted at their front ends to the undersides of the journal boxes, as shown at 34. The rear end of the dolly frame is supported by wheels 35 that are carried by frames 36 having upright caster bearings 37 on the rear end of the said dolly frame. Preferably a supplemental draft rod 38 has a yielding mounting 39 at the rear end of the dolly frame and is engaged with a hook 40 carried by the rear end of the tractor.

With this construction, it will be noted that the main draft is directly on the wheels 7 of the tractor 6 and as a consequence it has been found that the shock and strain of the draft is not nearly so severe on the rear structure of the tractor as when the trailer is connected to the gear housing.

From the foregoing, it is thought that the construction, operation and many advantages of the herein described invention will be apparent to those skilled in the art, without further description and it will be understood that various changes in the size, shape, proportion and minor details of construction within the scope of the appended claims may be resorted to without departing from the spirit or sacrificing any of the advantages of the invention.

What I claim is:—

1. The combination with a trailer member, of draft mechanism therefor, and means for securing said mechanism directly to the wheels of a tractor while permitting the free rotation of the wheels.

2. The combination with a trailer member, of draft mechanism therefor including a journal box member, a relatively rotatable member in the box member, and means for mounting one of the members on the wheel of a tractor so as to rotate therewith.

3. The combination with a trailer member, of draft mechanism therefor including a journal box member, a rotatable member in the box member, and means for securing the latter member to the wheel of a tractor so as to rotate therewith.

4. The combination with a trailer member, of draft mechanism therefor including relatively rotatable interfitted members, and means for securing one member to a ground wheel so as to rotate therewith.

5. The combination with a trailer member, of draft mechanism therefor including relatively rotatable interfitted members having an anti-friction bearing between them, and means for securing one member to a ground wheel so as to rotate therewith.

6. The combination with a trailer member, of draft mechanism therefor including relatively rotatable interfitted members, and means for securing one member to the inner side of a ground wheel around the axle and concentric to its axis of rotation.

7. The combination with a trailer having a ground wheel, of a draft element fixed thereto and rotatable therewith, and a trailer having a draft member on which the rotatable element of the wheel is journaled.

8. The combination with a trailer having a ground wheel, of a draft element fixed thereto and rotatable therewith, a trailer having a draft member, and a journal box on the draft member that rotatably receives the draft element of the wheel.

9. The combination with a trailer member having spaced draft bars provided at their front ends with journal boxes, of rotatable draft elements in the boxes, and means for mounting said elements on the rear wheels of a tractor.

10. The combination with a spindle element, of means for fastening it to a ground wheel to rotate with the wheel, of a trailer, and draft means for the trailer including a journal box in which the spindle element is rotatably mounted.

11. The combination with a spindle element comprising a flanged ring, of means for fastening it to a ground wheel around the axle to rotate with the wheel, of a trailer, and draft means for the trailer including a flanged journal box in which the spindle element is rotatably mounted, and antifriction bearings interfitted between the box and spindle element.

12. The combination with a trailer member including spaced draft bars, of journal boxes on the front ends of said bars, ring spindle elements journaled in the boxes, and means for attaching the spindle elements to the wheels of a vehicle so as to rotate therewith and transmit draft directly from said wheels to said trailer member.

13. The combination with a trailer member including spaced draft bars, of journal boxes secured to the front ends of said bars, braces between the draft bars and said boxes, spindle elements journaled in the boxes, and means for attaching the spindle elements to the wheels of a vehicle so as to rotate therewith and transmit draft directly from said wheels to said trailer member.

14. The combination with a trailer member including spaced draft bars, of journal boxes secured to the front ends of said bars, braces between the draft bars and said boxes, flanged spindle elements journaled in the boxes, anti-friction bearings interposed between the spindle elements and the boxes, means for retaining the spindle elements in the boxes, and means for attaching the spindle elements to the wheels of a vehicle so as to rotate therewith and transmit draft directly from said wheels to said trailer member.

15. The combination with a vehicle having rotatable supporting wheels, of a trailer member having draft mountings directly on said wheels, said wheels rotating with respect to the mountings.

16. The combination with a vehicle having rotatable rear driving wheels, of a trailer having non-rotatable draft mountings directly on said wheels, said wheels having rotatable portions engaged with the non-rotatable mountings.

17. The combination with a vehicle having rear wheels, of a dolly frame having draft connections directly with the rear wheels, said draft connections permitting the rotation of the rear wheels, and a trailer platform having a bolster mounting on the dolly frame.

18. The combination with a vehicle having rear wheels, of a dolly frame having draft connections at its front end directly with the rear wheels, said draft connections permitting the rotation of the rear wheels, supporting wheels for the rear end of the dolly frame, and a wheeled trailer platform having a bolster mounting on the dolly frame.

In testimony whereof, I affix my signature.

SAMUEL E. LIEDABRAND.